Nov. 14, 1950  R. H. McCLELLAN  2,529,847
APPARATUS FOR MANUFACTURING CLOSURES
FROM FLEXIBLE PLASTIC MATERIAL
Filed March 6, 1948  6 Sheets-Sheet 1
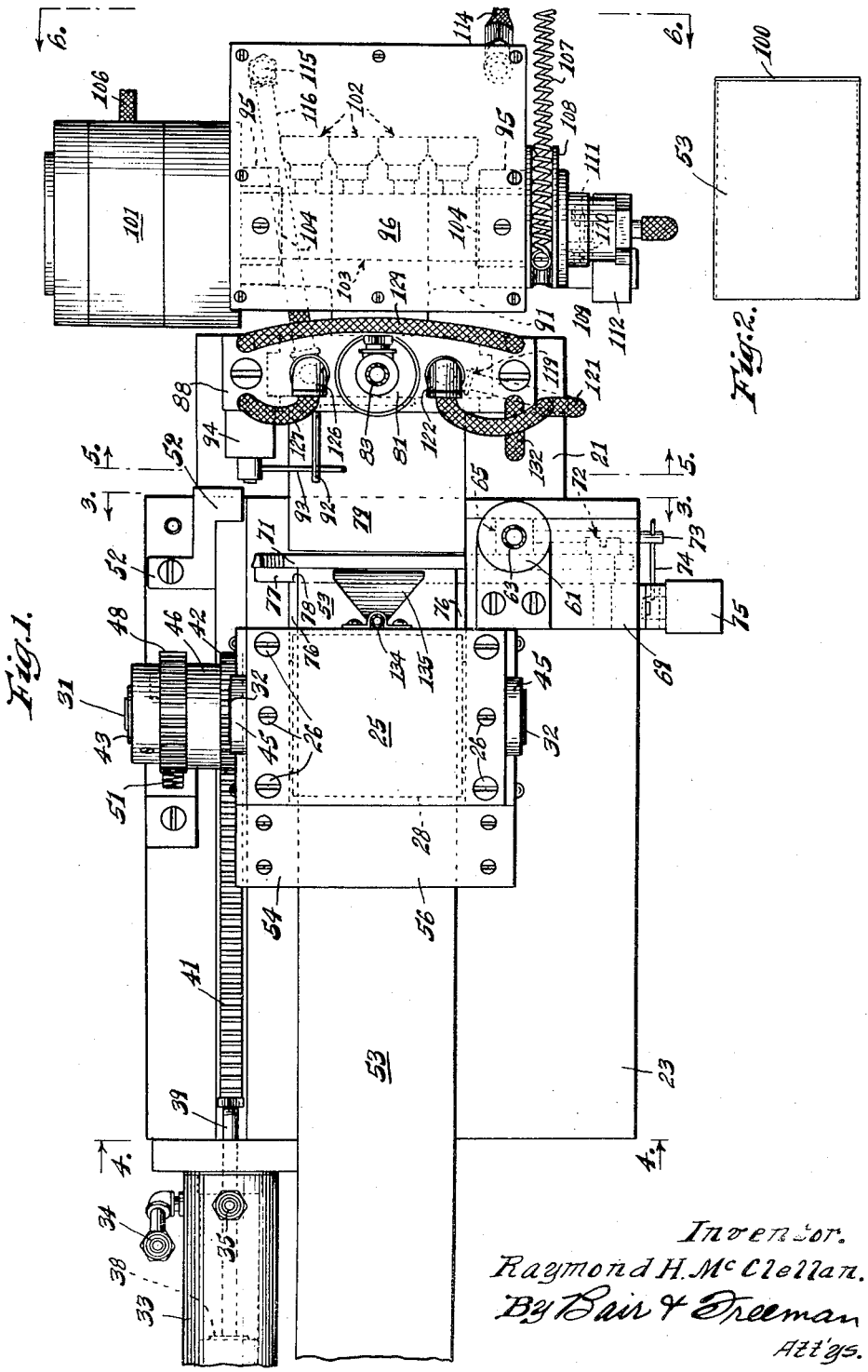
Inventor.
Raymond H. McClellan.
By Bair & Freeman
Att'ys.

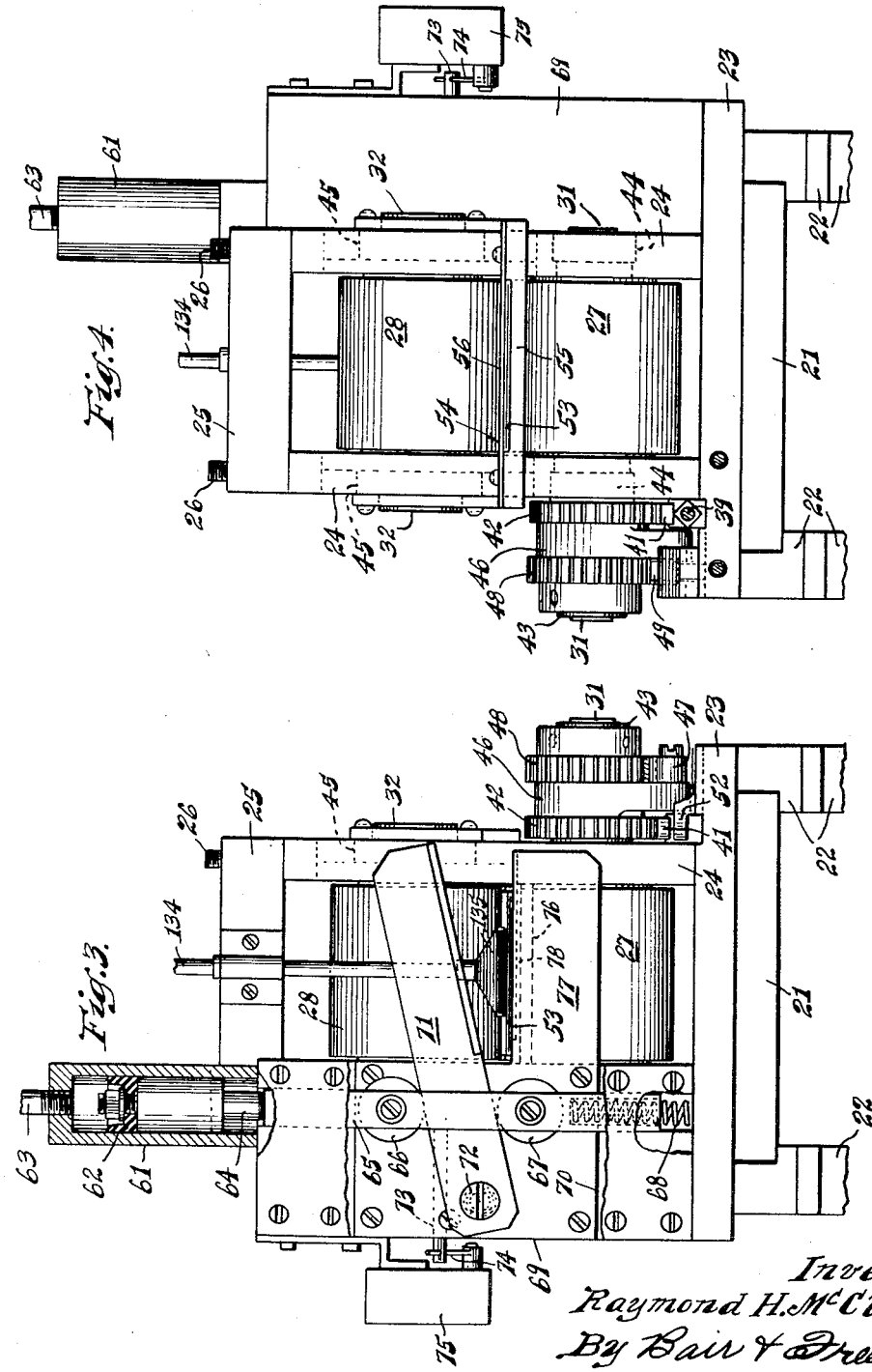

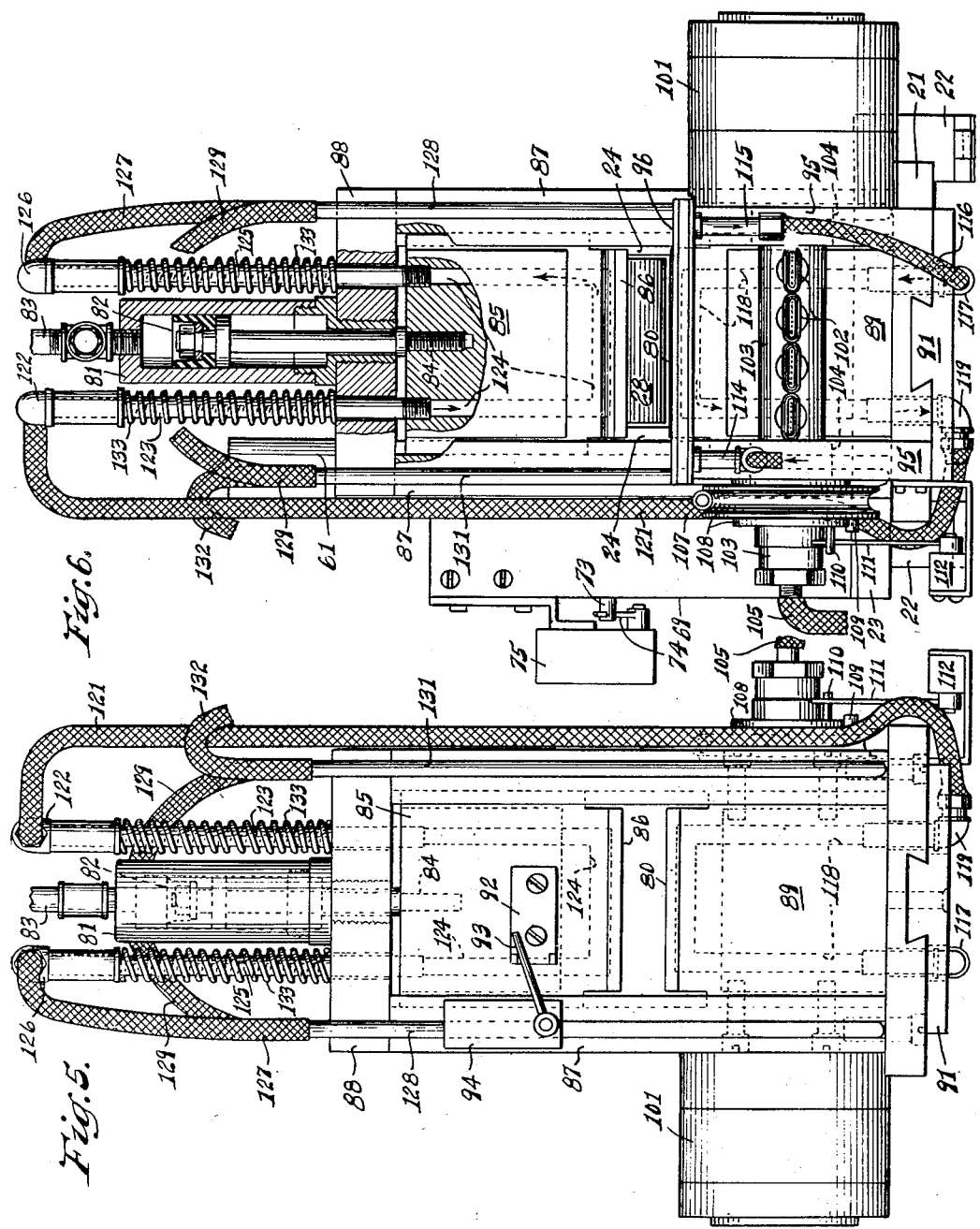

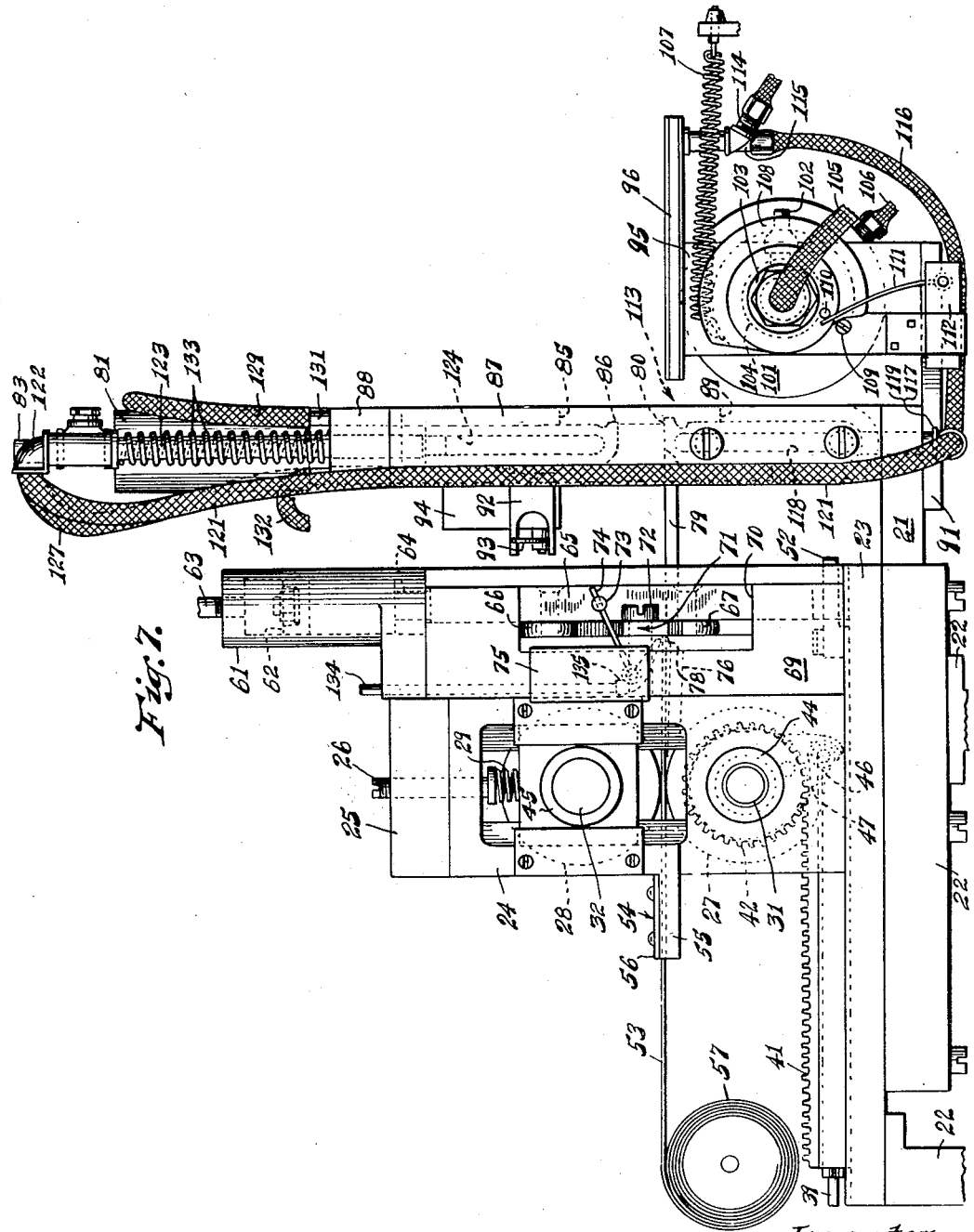

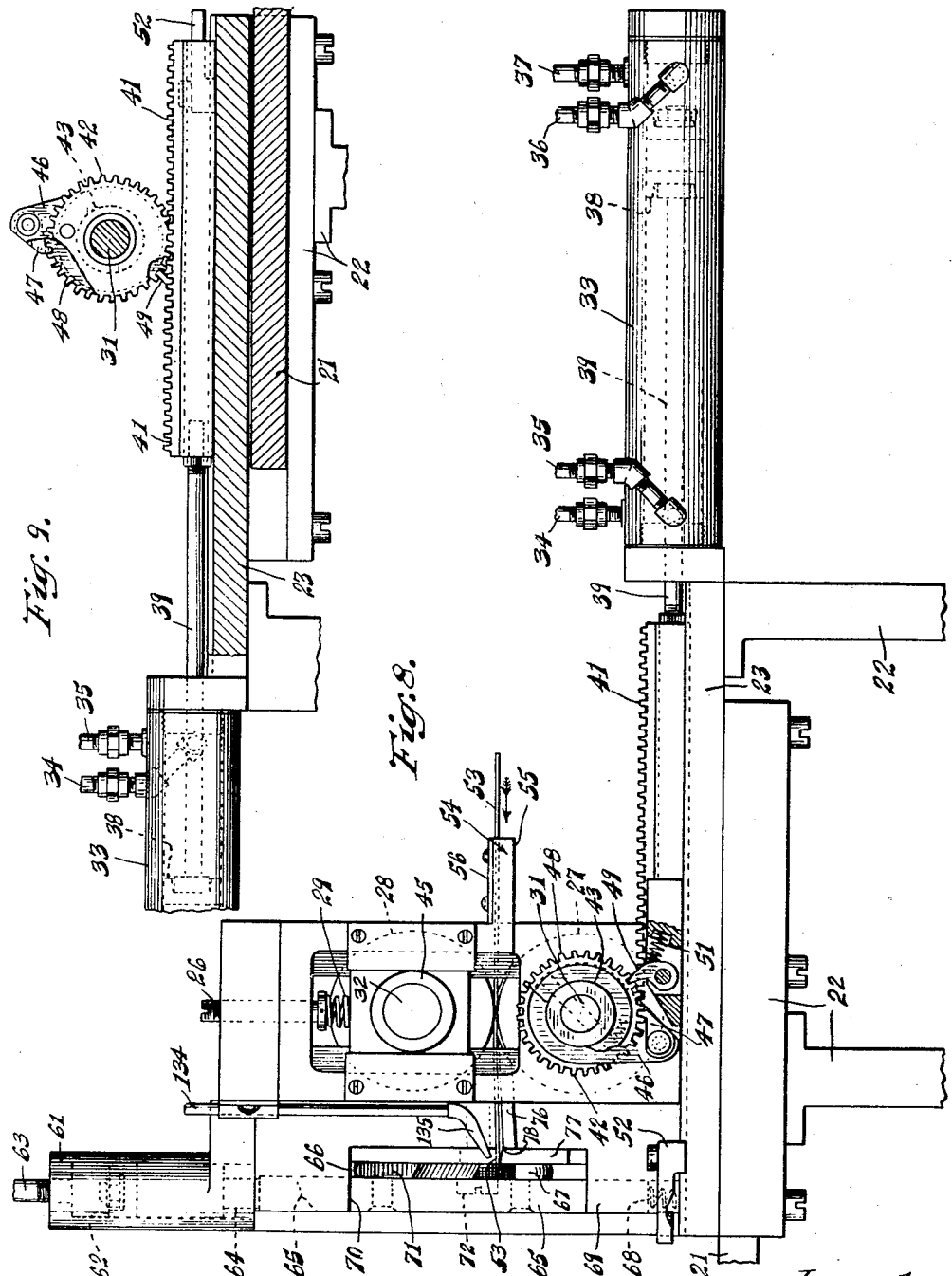

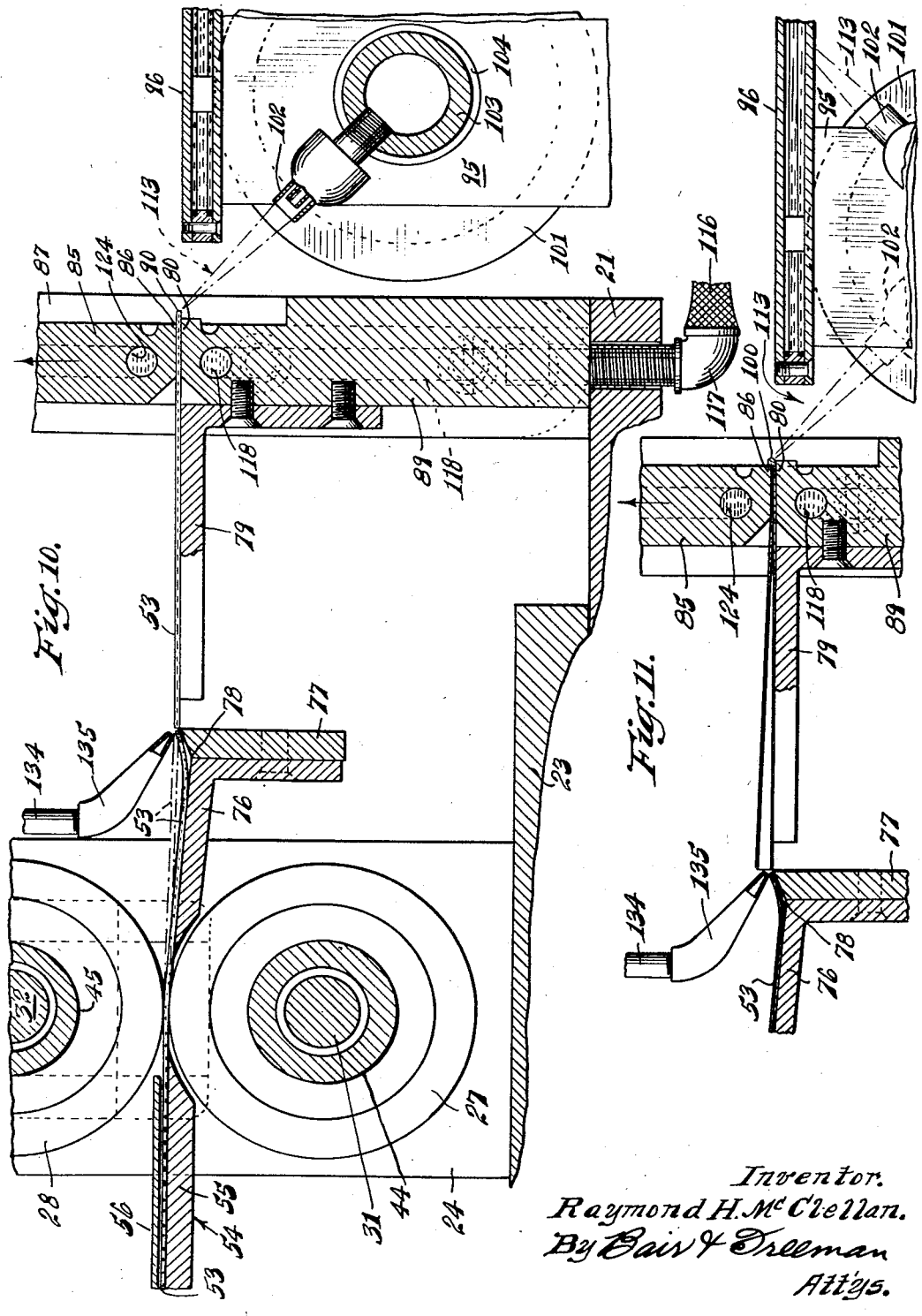

Patented Nov. 14, 1950

2,529,847

UNITED STATES PATENT OFFICE 2,529,847

APPARATUS FOR MANUFACTURING CLOSURES FROM FLEXIBLE PLASTIC MATERIAL

Raymond H. McClellan, Chicago, Ill., assignor to E. Edelmann & Co., Chicago, Ill., a corporation of Illinois Application March 6, 1948, Serial No. 13,467

24 Claims. (Cl. 154—42)

This invention relates to apparatus for manufacturing closures from flexible plastic materials.

A number of flexible plastic materials have been developed which are suitable for making closures in the form of boxes, bags and the like, which materials are extremely tough and are not readily ripped or torn. Such materials are particularly useful for packing and merchandising irregular articles, such as pipe couplings, fittings, nuts, bolts, etc. Not only are these materials very tough, but they are also at least semi-transparent, so that the contents thereof are visible. This is, obviously, an advantage in packing, in storing in stock rooms, or in selling to the public. An example of such material is polyethylene.

It is an object of the present invention to provide improved apparatus for manufacturing closures formed of flexible plastic material.

It is also an object of the invention to provide apparatus for manufacturing closures from a tube of flexible material, which tube may be originally formed in a continuous strip of material.

It is another object of the invention to provide apparatus for manufacturing closures from flexible plastic material which includes apparatus for heat sealing; and further to provide such improved apparatus when the closures are formed from continuous tubes of such material.

It is an additional object of the invention to prevent excessive heat from being applied to the flexible plastic material during the entire closure forming operation, except at the point of, and at the time of, sealing an open end thereof.

It is also an object of the invention to insure that the closure is ejected after sealing one end thereof over cool surfaces and out of any possible contact with the heat sealing means.

It is a further object of the invention to provide an improved cooling system for apparatus for manufacturing closures formed of flexible plastic material.

It is an important object of the invention to provide improved clamping and shearing mechanism for a machine for manufacturing closures formed of flexible plastic material.

With these and other objects in view, the invention consists in the construction, arrangement and combination of the various parts of my device whereby the objects contemplated are attained, as hereinafter more fully set forth, pointed out in the claims, and illustrated in the accompanying drawings, wherein:

Figure 1 is a top plan view of the improved machine for manufacturing closures or bags from flexible plastic material;

Figure 2 is a view of a bag formed by the machine shown in Figure 1, one end of which is sealed, and the other end of which is open for the reception of articles;

Figure 3 is a sectional view of the machine taken on line 3—3 of Figure 1, and illustrates the clamping means, the shearing device and a portion of the feed mechanism;

Figure 4 is a sectional view of the machine taken on line 4—4 of Figure 1, and illustrates primarily the feeding mechanism for the continuous strips or flat tubes of flexible plastic material;

Figure 5 is a sectional view taken on line 5—5 of Figure 1, and illustrates the clamping means and a portion of the cooling means therefor;

Figure 6 is a sectional view taken on line 6—6 of Figure 1, and illustrates the clamping means, the flame sealing means and a portion of the cooling system for the clamp and table for receiving the ejected closures;

Figure 7 is a side view of the machine shown in Figure 1;

Figure 8 is a side view of a portion of the machine shown in Figure 1 on the side opposite that shown in Figure 7;

Figure 9 is a side view of a portion of the feeding mechanism;

Figure 10 is a simplified view of the machine with the bag or closure and the flame motor in position to start sealing one end of the bag; and Figure 11 is a view similar to Figure 10, showing the bag sealed and the air ejector about to force the bag away from the clamp.

Referring specifically to the drawings for a detailed description of the invention, particularly to Figures 1 to 4, inclusive, a supporting table 21, having legs 22, is provided for supporting the mechanism. The mechanism includes a base plate 23, upon which a pair of uprights 24 are secured adjacent the central portion thereof. A top closure member 25 is bolted to the upright members 24. A plurality of bolts 26 are provided for the purpose of securing the top member 25 to the upright members 24. An inverted U-shaped housing is thereby formed, and a lower feed roller 27 and an upper feed roller 28 are disposed within the chamber thus formed. The upper feed rollers are supported by a shaft 32, which is adjustably supported in bearings 45. Spring members 29 provide for resiliently forcing the roller 28 against the roller 27. The force of the spring members 29 may be adjusted by turning the bolts 26. The lower feed roller 27 has its shaft 31 supported by bearings 44.

A pneumatic cylinder 33 is secured to the base plate 23. The pneumatic cylinder is provided with inlet and outlet conduits 34 and 35, respectively, at one end thereof, and with similar inlet and outlet conduits 36 and 37 at the other end thereof. A piston 38 is disposed within the cylinder 33. The cylinder 33 is a standard well known type of two-way pneumatic cylinder in which hydraulic fluid, such as air, may be applied to either end through one of the conduits and exhausted from the other end through one of the conduits. The piston 38 may, therefore, be forced in either direction.

The piston 38 is provided with a connecting rod 39 extending outwardly through one end of the cylinder 33, and connecting with a flat ratchet 41. The ratchet is adapted to engage with a toothed member or gear 42, which is loosely mounted on a collar 43, which is secured to the shaft 31 of the lower roller 27.

A collar 46 is also loosely journalled on the collar 43 and is secured to the rotatable gear member 42. The collar 46 is provided with a projecting ratchet arm 47, which is pivotally secured to a projection on the collar member 46. The ratchet arm 47 is adapted to engage with the teeth of a gear 48, which is secured to the collar 43. Since the collar 43 is secured to the shaft 31, rotation of the gear 48 will obviously impart rotatable movement to the lower feed roller 27. The feed rollers 27 and 28 are preferably formed with surfaces of rubber or the like, so that they will grip the material passing therethrough and feed it toward the remainder of the machine.

The material from which the closures or bags are to be made is shown, for example, in Figure 1 by the numeral 53, and is adapted to be fed from a roll 57 from left to right as viewed in Figures 1 and 7.

Also mounted on the bed plate of the machine is a pivoted detent 49, which is adapted to engage with the gear 48, and is spring pressed by a spring 51 for that purpose. The detent 49 prevents reverse movement of gear 48. A stop plate 52 is also secured to the bed plate 23 of the machine in a position to be engaged by the forward end of the ratchet 41. It will be apparent as the description proceeds that the stop 52 may be varied in shape so that the ratchet 41 may move through various distances to rotate the feed roll 27 and provide bags or closures of various lengths.

The material 53 is fed to the feed rollers 27 and 28 through a guide member generally indicated by the numeral 54. The guide 54 comprises a lower plate 55, which is secured to the upright members 24 and a plate 56 secured to the plate 55 in spaced relation thereto, so that the material 53 may pass between the plates 55 and 56 and thus be fed to the feed rollers in a substantially flat form. It is to be noted that the stock 53 is formed of a continuous sheet of material in the form of a flattened tube. This configuration of the stock will be apparent from Figures 3, 4 and 11. As stated above, the material is preferably a flexible plastic material, such as polyethylene.

A cylinder 61 is supported on an upright casting or forging 69, which forging is provided with a recess 70. A piston 62 is provided in the cylinder 61, and fluid under pressure, such as air, is delivered to the cylinder through a pipe 63.

A connecting rod 64 extends through the bottom of the cylinder 61, and is reciprocated by movement of the piston 62. The connecting rod 64 is secured to a vertically moving operating bar 65, for operating a shear blade 71. The shear blade 71 is pivoted at 72 on the member 89. Rollers 66 and 67 are secured to the operating bar 65, and a spring 68 is provided at the bottom of the operating bar 65 to normally bias the shear blade 71 upwardly to the position shown in Figure 3. When compressed air is released, roller 67 rolls along the lower surface of shear 71, and forces it upwardly.

The shear blade 71 is provided with a cutting edge which cooperates with the edge of a vertical plate 77, which is secured to a short table 76. The table 76 receives the material 53 as it passes between the feed rollers 27 and 28. The table 76 and plate 77 are formed so as to provide a slight depression 78, so that the material 53, after it is cut, bends into this depression, thus exposing one cut end of the tube of material 53. This construction is best shown in Figures 10 and 11.

An arm 73 is connected, as best shown in Figure 3, to the shear operating bar 65, and engages with the pivoted switch lever 74 for an electrical switch 75. Both the electrical and pneumatic control apparatus for the machine may take a number of forms and are not a part of the present invention, which is restricted to the machine itself.

It will be obvious that the shear blade 71 operates in the recess 70 to cut off the material 53 in predetermined lengths. The material is delivered to a table 79 which is secured to a lower clamping member 89. The material is clamped at one end thereof with a small overhanging portion of the material, as shown at 90, for a purpose hereinafter described, while the other end of the material is being cut.

The clamping device, in addition to the lower stationary clamp 89, includes an upper reciprocating clamp generally indicated at 85. The upper clamp has a flat clamping lower surface 86, while the lower clamp has an upper clamping surface 80.

The upper movable clamping member 85 is slidable on guide or slides 87, which are connected across their top at 88. A cylinder 81 is supported on the top member 88 and is provided with a piston 82. An inlet 83 is provided for compressed air, so that the piston 82 may be reciprocated in the cylinder 81. The piston 82 is provided with a threaded connecting rod 84 which is secured to the upper clamp member 85. Springs 133, which will be described more in detail hereinafter, tend to bias the upper clamp 85 to raised position. As compressed air is supplied to the cylinder 81, a piston 82 forces the clamp 85 against the bias of the springs 133, so that the material is clamped between the upper clamp 85 and the lower clamp 89, as shown, for example, in Figure 10. The table 96 is supported on upright leg members 95 from a base 91, which base 91 is supported by the table 21.

The material as it leaves the clamp, and after having been sheared and sealed at one end, in a manner hereinafter described, is delivered to a plate 96, which is cooled, preferably, by the flow of water therethrough. The finished product is in the form of a flat bag, as shown in Figure 2, with one end thereof sealed, as shown at 100. These bags are removed from the table 96 by suitable mechanism or manual means.

Mounted below the table 96 are a plurality of gas burners 102, which are secured to, and revolved by, a shaft 103, having suitable bearings 104. The shaft 103 is rotated in one direction by an air operated motor 101. Gas for the burners 102 is supplied through a flexible conduit 105, while air for operating the motor 101 is supplied through a flexible conduit 106. The burners 102 are rotated in one direction by the air motor 101, when air is applied through the inlet 106. When the air is released, the burners 102 are rotated in the opposite direction by a spring 107, which is secured to a pulley 108. The pulley 108 is provided with a pair of shoulders and a stop pin 109 is secured to a stationary part of the mechanism. The burners 102 are, therefore, positioned as shown in Figure 7, when the air is released from the air motor 101. When the air is applied to the air motor 101, the burners are turned to the position shown, for example, in Figure 10. In this latter position, the flame is directed along the edge 90 of the bag which is protruding between the clamps 85 and 89, thus melting the material and forming the closed bead 100.

A pin 110 is provided on the pulley 108 in a position to engage an operating arm 111 of a switch 112.

It will be noted that the material receiving table 96 is spaced from the clamping mechanism as shown at 113, so that gas flame from burners 102 may strike the edge 90 of the material.

It is necessary to cool parts of the machine which are adjacent or might be heated by the burners 102, since the melting point of the material, such as polyethylene, is very low, and only a small amount of heat is required to turn it into a gummy mass. A cooling system is, therefore, provided for the receiving plate or table 96 and the entire clamping mechanism.

Cooling fluid, preferably water, enters from a suitable source of supply through a flexible conduit and fitting 114 and first flows through the hollow table 96. Water from the table 96 is fed therefrom through a fitting 115 and a flexible conduit 116. From the flexible conduit 116, the fluid enters a fitting 117 which communicates with a passage 118 in the bottom clamp 89. The cooling fluid travels completely through the bottom clamp 89, and is conveyed therefrom through a fitting 119 and a flexible conduit 121 to a fitting 122 at the top of the clamping mechanism. The cooling fluid then passes through a rigid conduit 123 and into a passageway 124, which extends entirely through the upper clamp 85. The cooling fluid then passes through another rigid conduit 125 to a fitting 126, also at the upper end of the clamping device, and thence to a flexible conduit 127.

It will be noted that the rigid conduits 123 and 125, which connect to the upper clamp 85, are surrounded by the springs 133, and that suitable shoulders, which engage with the springs 133, are provided on the fittings 122 and 126 to bias the upper clamp 85 upwardly.

From the coupling 126, a flexible conduit 127 communicates with a rigid U-shaped conduit 128, which surrounds one of the guides 87. Cooling fluid flows through the pipe 128, thence through a cross-over flexible connection 129, and enters another U-shaped rigid pipe in contact with the other slide 87. A flexible connection 132 then conveys the cooling fluid to the drain.

In order to remove the severed and sealed bag, a nozzle 135 is provided adjacent the shearing wall 77, as best shown in Figures 10 and 11. The nozzle 135 is periodically supplied with compressed air through a conduit 134.

It is to be noted that the machine is operated in proper timed sequence throughout, so that the various steps will be performed to form the bags.

Operation

After the tube of polyethylene material has been started through the feed rolls 27 and 28, compressed air is supplied to the right hand end of the cylinder 33, thus moving the piston 38 to the left, as viewed in Figure 8. The ratchet 41 then rotates the gear 42, the amount of rotation or the number of teeth moved depending upon the size or position of the stop 52 for the ratchet 41. As the gear 42 rotates, it rotates the collar 46 therewith and carries the detent 47 therewith. The detent 47 engages with the gear 48 and rotates it. This rotates the collar 43 and shaft 31 for the lower feed roll 27. The material 53 is, therefore, moved forward a predetermined distance. When bags of a different size are to be made, the position or the size of the stop 52 is changed.

Compressed air is then applied to the left hand side of the cylinder 33, as viewed in Figure 8, to move the piston to the right. This moves the ratchet 41 to the right and rotates gear 42 in the opposite direction. Collar 46 and detent 47 are also moved in the opposite direction, the detent 47 sliding over the gear teeth of gear 48. At this time, however, the detent 49 prevents movement of the gear 48, so that no motion is imparted to the feed roll 27.

As soon as the material 53 has been fed to the position shown, for example, in Figure 10, the feed rolls stop, and compressed air is applied to the shear cylinder 61 and the clamp cylinder 81. The shear blade 71 is then operated to cut off the material as it is clamped between the faces 80 and 86 of the clamping mechanism. The shear blade 71 is then retracted to its upper position, such as shown in Figure 3, but the material 53 remains clamped, as shown in Figures 10 and 11.

The burners 102 are already ignited, and air is then applied to the air motor 101 to rotate the burners 102 to the position shown in Figure 10, whereupon the flame melts only the edge of the material 53 to form the bead 100 and close that particular end. Thereafter, air pressure is released from the motor 101, and the spring 107 returns the nozzles 102 to the position shown in Figure 7.

Preferably, after the nozzles 102 have completely returned to the position shown in Figure 7, air pressure is released from the clamping cylinder 81 and air is supplied to the nozzle 135, to thus blow the bag onto the receiving table 96. The depression 98 permits to enter the open end of the bag.

It will also be apparent that all of the parts which might possibly be heated by the gas flame 102 are cooled by the circulating cooling water. This includes the table 96 and the entire clamping device. This is a very important feature of the invention, since, if either the table 96 or the clamping device warm up to any appreciable degree, the polyethylene will melt.

After the bag is removed from the table 96, it may be filled with any desirable material and the other end heat sealed, either by hand or by a suitable machine.

From the foregoing it will be apparent that I have provided an improved machine for making closures from flexible plastic material.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being arranged to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for sealing said forward edge of the tube by subjecting it to the heating means, and means for cooling said clamping means.

2. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being arranged to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for sealing said forward edge of the tube by subjecting it to the heating means, a table for receiving the sealed tube, and means for cooling said clamping means and said table.

3. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being arranged to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, and means for sealing said forward edge of the tube by subjecting it to the heating means, said intermittent feeding means being adapted to feed predetermined lengths of said continuous tube to said clamping and severing means.

4. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being arranged to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for sealing said forward edge of the tube by subjecting it to the heating means, said intermittent feeding means being adapted to feed predetermined lengths of said continuous tube to said clamping and severing means, and means for cooling said clamping means.

5. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being arranged to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for sealing said forward edge of the tube by subjecting it to the heating means, said intermittent feeding means being adapted to feed predetermined lengths of said continuous tube to said clamping and severing means, a table for receiving the sealed tube, and means for cooling said clamping means and said table.

6. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, a table for receiving the sealed tube, means for cooling said clamping means and said table, said heating means comprising a rotatable gas burner disposed below said table and being adapted in one position thereof to direct a flame between said table and said clamping jaws to contact and seal the protruding end of said tube.

7. Apparatus for forming closures from continuous tubes of flexible plastic material comprising means for severing said continuous tube into individual tubes, heating means for sealing one end of the severed tubes, means for clamping the severed tubes in a position wherein one end thereof may be exposed to said heating means, means for moving said heating means into contact with said exposed edge of the severed tubes to heat seal the same and away from said tube and clamping means at all other times, means for feeding predetermined lengths of said continuous tube to said severing means, a table for receiving said sealed tubes, compressed air means for ejecting said sealed tubes from said clamping means and a table for receiving said sealed tubes as they are ejected.

8. Apparatus for forming closures from continuous tubes of flexible plastic material comprising means for severing said continuous tube into individual tubes, heating means for sealing one end of the severed tubes, means for clamping the severed tubes in a position wherein one end thereof may be exposed to said heating means, means for moving said heating means into contact with said exposed edge of the severed tubes to heat seal the same and away from said tube and clamping means at all other times, means for feeding predetermined lengths of said continuous tube to said severing means, a table for receiving said sealed tubes, compressed air means for ejecting said sealed tubes from said clamping means, a table for receiving said sealed tubes as they are ejected and means for cooling said table.

9. Apparatus for forming closures for continuous tubes of flexible plastic material comprising means for severing said continuous tube into individual tubes, heating means for sealing one end of the severed tubes, means for clamping the severed tubes in a position wherein one end thereof may be exposed to said heating means, means for moving said heating means into contact with said exposed edge of the severed tubes to heat seal the same and away from said tube and clamping means at all other times, means for feeding predetermined lengths of said continuous tube to said severing means, a table for receiving said sealed tubes, compressed air means for ejecting said sealed tubes from said clamping means and a table for receiving said sealed tubes as they are ejected, said table being spaced from said clamping means.

10. Apparatus for forming closures from a continuous tube of a flexible plastic material comprising means for feeding the continuous tube of flexible plastic material longitudinally, means comprising a pair of normally biased apart clamping jaws receiving the flexible plastic material from the feeding means, means for stationarily positioning the fed plastic material adjacent to one of the clamping jaws, means for severing the plastic material when in the stationary position at a point between the clamping jaws and the feeding means whereby two open edges result; means for clamping the jaws together when the plastic material is in the stationary position, said feeding means being set to protrude one open edge of said plastic material a short distance beyond the clamped jaws, a heating means mounted upon said apparatus, and means for sealing said one end of the tube by subjecting the protruding portion of the plastic material to the heating means.

11. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being arranged to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, and means for sealing said forward edge of the tube by subjecting it to the heating means.

12. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, and means for opening the jaws after the heating means have been removed.

13. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, and means for cooling said clamping means.

14. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, a table for receiving the sealed tube, and means for cooling said clamping means and said table.

15. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, and means for opening the jaws after the heating means have been removed, said intermittent feeding means being adapted to feed predetermined lengths of said continuous tube to said clamping and severing means.

16. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, a table for receiving the sealed tube, and means for cooling said clamping means and said table, said intermittent feeding means being adapted to feed predetermined lengths of said continuous tube to said clamping and severing means.

17. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being arranged to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for sealing said forward edge of the tube by subjecting it to the heating means, and compressed air means for ejecting said sealed tube from said clamping means.

18. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, and compressed air means for ejecting said sealed tube from said clamping means.

19. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, compressed air means for ejecting said sealed tube from said clamping means, a table for receiving the sealed tubes as they are ejected, and means for cooling said clamping means and said table.

20. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, and means for exposing the severed trailing end of the tube.

21. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, means for exposing the severed trailing end of the tube, and compressed air means adjacent the severed trailing end of the tube for ejecting said sealed tube from said clamping means.

22. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, means for bending the severed end of the continuous tube of flexible plastic material out of position so as to expose the trailing end of the severed tube, and compressed air means adjacent the exposed and severed trailing end of the tube for ejecting said sealed tube from said clamping means.

23. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, means for maintaining the trailing end of the severed piece of plastic material horizontally, and means for bending the severed end of the continuous tube of flexible plastic material out of position so as to expose the trailing end of the severed tube.

24. Apparatus for forming closures from a continuous tube of a flexible plastic material, comprising means for intermittently feeding the continuous tube of flexible plastic material longitudinally, means comprising a pair of normally biased apart clamping jaws receiving the flexible plastic material from the feeding means, said intermittent feeding means being adapted to stationarily position the forward end of said fed plastic material adjacent to one of the clamping jaws, means for severing the plastic material when in the stationary position at a point between the clamping jaws and the feeding means whereby two open edges result, means for clamping the jaws together when the plastic material is in the stationary position, said feeding means being arranged to protrude the forward edge of said plastic material beyond the clamped jaws, a heating means mounted upon said apparatus, means for subjecting the protruding edge of the plastic material to said heating means when the jaws are in the clamped position so as to seal one end of the tube, means for removing the heating means while the jaws are in the clamped position, means for opening the jaws after the heating means have been removed, means for maintaining the trailing end of the severed piece of plastic material horizontally, means for bending the severed end of the continuous tube of flexible plastic material out of position so as to expose the trailing end of the severed tube, and compressed air means adjacent the exposed and trailing severed end of the tube for ejecting said sealed tube from said clamping means.

RAYMOND H. McCLELLAN.

REFERENCES CITED

The following references are of record in the file of this patent:

UNITED STATES PATENTS

| Number | Name | Date |
|---|---|---|
| 2,232,640 | Schwartzman | Feb. 18, 1941 |
| 2,395,077 | Southwick | Feb. 19, 1946 |
| 2,459,234 | McDowall | Jan. 18, 1949 |
| 2,459,235 | Hewitt | Jan. 18, 1949 |